United States Patent
Winston et al.

(10) Patent No.: US 10,259,934 B2
(45) Date of Patent: Apr. 16, 2019

(54) RUBBER COMPONENT FOR A TIRE WITH IMPROVED ABRASION RESISTANCE

(71) Applicants: Compagnie Generale des Etablissements Michelin, Clermont-Ferrand (FR); Michelin Recherche et Technique S.A., Granges-Paccot (CH)

(72) Inventors: Paul Winston, Greer, SC (US); Xavier Saintigny, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 4 days.

(21) Appl. No.: 15/522,950

(22) PCT Filed: Oct. 31, 2014

(86) PCT No.: PCT/US2014/063528
§ 371 (c)(1),
(2) Date: Apr. 28, 2017

(87) PCT Pub. No.: WO2016/069012
PCT Pub. Date: May 6, 2016

(65) Prior Publication Data
US 2017/0313861 A1    Nov. 2, 2017

(51) Int. Cl.
| | |
|---|---|
| C08L 9/06 | (2006.01) |
| B60C 1/00 | (2006.01) |
| C08L 9/00 | (2006.01) |
| C08K 3/04 | (2006.01) |
| C08K 3/06 | (2006.01) |
| C08K 5/14 | (2006.01) |
| C08L 57/02 | (2006.01) |
| C08K 5/00 | (2006.01) |

(52) U.S. Cl.
CPC ............ *C08L 9/06* (2013.01); *B60C 1/0016* (2013.01); *B60C 1/0025* (2013.01); *C08K 3/04* (2013.01); *C08K 3/06* (2013.01); *C08K 5/0016* (2013.01); *C08K 5/14* (2013.01); *C08L 9/00* (2013.01); *C08L 57/02* (2013.01); *B60C 2200/14* (2013.01); *C08L 2205/02* (2013.01)

(58) Field of Classification Search
CPC ........................................................ C08L 9/06
See application file for complete search history.

(56) References Cited

U.S. PATENT DOCUMENTS

| | | |
|---|---|---|
| 2007/0293619 A1 | 12/2007 | Jacoby et al. |
| 2013/0096248 A1 | 4/2013 | Thompson et al. |
| 2014/0005297 A1 | 1/2014 | Papakonstantopoulos et al. |
| 2015/0087745 A1 | 3/2015 | Chekanov et al. |

FOREIGN PATENT DOCUMENTS

| | | | |
|---|---|---|---|
| EP | 0390012 A1 | 10/1990 | |
| GB | 1436373 A | 5/1976 | |
| WO | 2013040425 A1 | 3/2013 | |
| WO | WO-2013039498 A1 * | 3/2013 | ........... B60C 1/0016 |

OTHER PUBLICATIONS

International Search Report and Written Opinion dated Jun. 29, 2015.

* cited by examiner

*Primary Examiner* — Arrie L Reuther
(74) *Attorney, Agent, or Firm* — Frank J. Campigotto

(57) ABSTRACT

A rubber component for a tire is disclosed that is manufactured from a rubber composition that is based upon a cross-linkable elastomer composition that includes 100 phr of two elastomer types including at least 50 phr of a styrene-butadiene copolymer (SBR) with a polybutadiene (BR) as the remainder. Such compositions may further include between 75 phr and 130 phr of a carbon black. Also included in such elastomers is a plasticizing system that includes a plasticizing resin having a glass transition temperature (Tg) of at least 25° C. and a plasticizing liquid. The plasticizing system is added in an effective amount to provide the cured rubber composition with a shear modulus G* measured at 60° C. of between 0.7 MPa and 1.6 MPa and a measured Tg of between −30° C. and 0° C. The elastomer composition is cured with curing system that includes both a peroxide and sulfur.

18 Claims, No Drawings

US 10,259,934 B2

RUBBER COMPONENT FOR A TIRE WITH IMPROVED ABRASION RESISTANCE

BACKGROUND OF THE INVENTION

Field of the Invention

This invention relates generally to articles made of rubber compositions and more particularly to those having rubber compositions cured with a peroxide/sulfur curing system.

Description of the Related Art

It is desirable to provide rubber articles that have improved properties in abrasion resistance. Abrasion is the process of damaging or wearing away a material by rubbing, grinding or scraping the material against something else. By improving abrasion resistance, articles can be made to last longer and therefore be more cost efficient.

In addition to the reduction of the damage caused by wearing away the material being abraded, abrasion resistance can also improve the protection against thermal degradation and oxidation that may accompany abrasion damage due to the generation of heat resulting from the abrasion damage itself, i.e., the tearing and removal of the rubber material through the abrasion process.

Tire designers seek to improve the abrasion resistance of those parts of the tire that are on the outside of the tire and subject to abrasion, namely the tire, the bead toe, and the sidewalls. It is a goal for tire designers to find abrasion resistant rubber compositions that are useful for sidewall and rim protector applications and treads in particular. Treads are of course subjected to friction and rubbing as they rotate against a road surface and sidewalls are subjected to abrasion when, for example, they are unexpectedly rubbed against a curb or a road hazard. Bead toes are constantly in contact with the metal rim of the wheel and are also subjected to abrasion.

SUMMARY OF THE INVENTION

Particular embodiments of the present invention include rubber components for a tire that are manufactured from a rubber composition that is based upon a cross-linkable elastomer composition. One such disclosed rubber composition is based upon an elastomer composition that includes, per 100 phr, 100 phr of two elastomer types including at least 50 phr of a styrene-butadiene copolymer (SBR) with a polybutadiene (BR) as the remainder. Such compositions may further include between 75 phr and 130 phr of a carbon black.

Also included in such elastomer compositions are a plasticizing system that includes a plasticizing resin having a glass transition temperature (Tg) of at least 25° C. and a plasticizing liquid. The plasticizing system is added in an effective amount to provide the cured rubber composition with a shear modulus G* measured at 60° C. of between 0.7 MPa and 1.6 MPa and a Tg of between −30° C. and 0° C.

The cross-linkable elastomer composition further includes a dual curing system that includes a peroxide curing agent and a sulfur curing agent for curing the elastomer composition.

Particular embodiments of the present invention include the rubber component as a tire tread.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include articles that have improved abrasion resistance and rubber compositions from which the articles are made. More particularly it has been found that the disclosed rubber compositions that are cured with a dual curing agent system that includes both a sulfur curing agent and a peroxide curing agent provide a cured rubber composition that has improved abrasion resistant properties. The rubber compositions disclosed herein are particularly useful in the tire industry for forming different components of the tire including, for example, the tread and the sidewall components. The rubber compositions disclosed herein may be particularly useful for vehicles that operate off-the-road and/or under more severe conditions that may place the tire in a more abrasive environment than may be found on a standard paved roadway.

As used herein, "phr" is parts per hundred parts of rubber by weight and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is known generally, a tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

As is also known generally, the sidewall of the tire is that portion of the tire that is between the tread and bead section of the tire where the tire is mounted onto a wheel. The sidewall protects the casing or body plies from scuffing, controls the vehicle/tire ride characteristics and provides support assistance to the tread.

Furthermore, the bead toe of the tire is the portion that makes contact with the rim of the metal wheel and forms the air seal between the tire and the wheel.

Suitable compositions for making the treads disclosed herein include a particular rubber component, a plasticizing system, reinforcement filler and dual curing agent system that includes both a sulfur curing agent and a peroxide curing agent.

The rubber components included in the rubber composition are highly unsaturated rubbers that include two types—styrene-butadiene copolymers (SBR) and polybutadienes (BR), both quite commonly used in the tire industry. Polybutadienes are useful in many rubber articles and are homopolymers of conjugated 1,3-butadiene. The polybutadienes are particularly useful in maintaining a desirable wear characteristic of the tread since the addition of BR typically improves the wear property.

SBR is a copolymer of styrene and 1,3-butadiene and is one of the most commonly used synthetic rubbers. The microstructure of SBR is typically described in terms of the amount of bound styrene and the form of the butadiene portion of the polymer. A typical SBR that is often suitable for use in tires is around 25 wt. % bound styrene. Materials having a very high content of bound styrene, e.g., around 80 wt. %, are identified as high styrene resins and are not suitable as an elastomer for manufacturing treads. Particular embodiments of the present invention may utilize an SBR having a bound styrene content of between 3 wt. % and 40 wt. % or alternatively between 10 wt. % and 35 wt. %, between 15 wt. % and 30 wt. % or between 20 wt. % and 40 wt. % bound styrene.

Because of the double bond present in the butadiene portion of the SBR, the butadiene portion is made up of three forms: cis-1,4, trans-1,4 and vinyl-1,2. In particular embodiments, the SBR materials may be characterized as having a high trans-1,4 content of at least 30 wt. % or alternatively between 30 wt. % and 70 wt. %, between 35 wt. % and 55 wt. % or between 35 wt. % and 40 wt. %.

Methods for determining the microstructure of the butadiene portion of the SBR materials are well known to those having ordinary skill in the art and include, for example, NMR methods and infrared spectroscopy methods. In one suitable NMR spectroscopy method, a carbon-13 NMR analyses may be performed using, for example, a Bruker AM250 spectrometer. The nominal frequency of carbon-13 is 62.9 MHz and the spectra are recorded without the "nuclear Overhauser effect" (NOE) to ensure quantitative results. The spectral width is 240 ppm. The angle pulse used is a 90° pulse, the duration of which is 5 μs. Low-power decoupling with a wide proton band are used to eliminate scalar $^1$H-carbon-13 coupling during carbon-13 acquisition. The sequence repetition time is 4 seconds. The number of transients accumulated to increase the signal/noise ratio is 8192. The spectra are calibrated against the $CDCl_3$ band at 77 ppm.

The rubber compositions useful for the articles disclosed herein may include a functionalized SBR component. Functionalized rubbers, i.e., those appended with active moieties, are well known in the industry. The elastomers may be functionalized by attaching these active moieties to the polymer backbone, along the branches of the polymer or at the branch ends of the polymer. Examples of functionalized elastomers include silanol or polysiloxane functionalized elastomers, examples of which may be found in U.S. Pat. No. 6,013,718, which is hereby fully incorporated by reference. Other examples of functionalized elastomers include those having alkoxysilane groups as described in U.S. Pat. No. 5,977,238, carboxylic groups as described in U.S. Pat. No. 6,815,473, polyether groups as described in U.S. Pat. No. 6,503,973 or amino groups as described in U.S. Pat. No. 6,800,582 and are all incorporated herein by reference.

In particular embodiments of the rubber compositions disclosed herein, the SBR is a functionalized elastomer having functional moieties attached to at least a portion of the total number of branch ends or alternatively, along the branches of the butadiene portion of the polymer. Such functional moieties may include, for example, amino groups, silanol groups, alkoxysilane groups, carboxylic groups or polyether groups. In particular embodiments, the functional moieties may be selected from amino groups, silanol groups or alkoxysilane groups or alternatively, just silanol groups. In particular embodiments, the functionalized SBR may include a mixture of two or more different such functionalized SBR's or limited to one of the functionalized SBR's.

The rubber compositions disclosed herein may include between 50 phr and 90 phr of the SBR or alternatively between 50 phr and 80 phr, between 55 phr and 80 phr or between 55 phr and 70 phr. Likewise the rubber compositions may include between 10 phr and 50 phr of the polybutadiene rubber or alternatively between 20 phr and 50 phr, between 20 phr and 45 phr or between 30 phr and 45 phr.

In addition to the rubber components described above, the rubber composition suitable for the rubber articles disclosed herein may further include a plasticizing system. The plasticizing system provides both an improvement to the processability of the rubber mix and a means for adjusting the rubber composition's dynamic shear modulus and glass transition temperature. Suitable plasticizing systems include both a plasticizing liquid and a plasticizing resin to achieve the desired improved abrasion resistance.

Suitable plasticizing liquids may include any liquid known for its plasticizing properties with diene elastomers. At room temperature (23° C.), these liquid plasticizers or these oils of varying viscosity are liquid as opposed to the resins that are solid. Examples include those derived from petroleum stocks, those having a vegetable base and combinations thereof. Examples of oils that are petroleum based include aromatic oils, paraffinic oils, naphthenic oils, MES oils, TDAE oils and so forth as known in the industry. Also known are liquid diene polymers, the polyolefin oils, ether plasticizers, ester plasticizers, phosphate plasticizers, sulfonate plasticizers and combinations of liquid plasticizers.

Examples of suitable vegetable oils include sunflower oil, soybean oil, safflower oil, corn oil, linseed oil and cotton seed oil. These oils and other such vegetable oils may be used singularly or in combination. In some embodiments, sunflower oil having a high oleic acid content (at least 70 weight percent or alternatively, at least 80 weight percent) is useful, an example being AGRI-PURE 80, available from Cargill with offices in Minneapolis, Minn. In particular embodiments of the present invention, the selection of suitable plasticizing oils is limited to a vegetable oil having high oleic acid content.

The amount of plasticizing liquid useful in any particular embodiment of the rubber compositions disclosed herein depends upon the particular circumstances and the desired result. In general, for example, the plasticizing liquid may be present in the rubber composition in an amount of between 5 phr and 60 phr or alternatively, between 10 phr and 50 phr, between 10 phr and 40 phr, between 10 phr and 30 phr, between 15 phr and 50 phr or between 5 phr and 25 phr. Since both a plasticizing liquid and a plasticizing hydrocarbon resin are included in the plasticizing system, the amount of both types of plasticizers is adjusted as described below to obtain the desired physical characteristics of the rubber article.

A plasticizing hydrocarbon resin is a hydrocarbon compound that is solid at ambient temperature (e.g., 23° C.) as opposed to liquid plasticizing compounds, such as plasticizing oils. Additionally a plasticizing hydrocarbon resin is compatible, i.e., miscible, with the rubber composition with which the resin is mixed at a concentration that allows the resin to act as a true plasticizing agent, e.g., at a concentration that is typically at least 5 phr.

Plasticizing hydrocarbon resins are polymers/oligomers that can be aliphatic, aromatic or combinations of these types, meaning that the polymeric base of the resin may be formed from aliphatic and/or aromatic monomers. These resins can be natural or synthetic materials and can be petroleum based, in which case the resins may be called petroleum plasticizing resins, or based on plant materials. In particular embodiments, although not limiting the invention, these resins may contain essentially only hydrogen and carbon atoms.

The plasticizing hydrocarbon resins useful in particular embodiment of the present invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include styrene, alpha-methylstyrene, ortho-, meta-, para-methylstyrene, vinyl-toluene, para-tertiobutylstyrene, methoxystyrenes, chloro-styrenes, vinyl-mesitylene, divinylbenzene, vinyl-naphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the present invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ Cut/$C_9$ cut copolymer resins, and mixtures thereof.

Commercially available plasticizing resins that include terpene resins suitable for use in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 sold by the company DRT of France. DERCOLYTE L120 polyterpene-limonene resin has a number average molecular weight of about 625, a weight average molecular weight of about 1010, an Ip of about 1.6, a softening point of about 119° C. and has a glass transition temperature of about 72° C. Still another commercially available terpene resin that may be used in the present invention includes SYLVARES TR 7125 and/or SYLVARES TR 5147 polylimonene resin sold by the Arizona Chemical Company of Jacksonville, Fla. SYLVARES 7125 polylimonene resin has a molecular weight of about 1090, has a softening point of about 125° C., and has a glass transition temperature of about 73° C. while the SYLVARES TR 5147 has a molecular weight of about 945, a softening point of about 120° C. and has a glass transition temperature of about 71° C.

Other suitable plasticizing hydrocarbon resins that are commercially available include $C_5$ cut/vinyl-aromatic styrene copolymer, notably $C_5$ cut/styrene or $C_5$ cut/$C_9$ cut from Neville Chemical Company under the names SUPER NEVTAC 78, SUPER NEVTAC 85 and SUPER NEVTAC 99; from Goodyear Chemicals under the name WINGTACK EXTRA; from Kolon under names HIKOREZ T1095 and HIKOREZ T1100; and from Exxon under names ESCOREZ 2101 and ECR 373.

Yet other suitable plasticizing hydrocarbon resins that are limonene/styrene copolymer resins that are commercially available include DERCOLYTE TS 105 from DRT of France; and from Arizona Chemical Company under the name ZT115LT and ZT5100.

It may be noted that the glass transition temperatures of plasticizing resins may be measured by Differential Scanning calorimetry (DCS) in accordance with ASTM D3418 (1999). In particular embodiments, useful resins may be have a glass transition temperature that is at least 25° C. or alternatively, at least 40° C. or at least 60° C. or between 25° C. and 95° C., between 40° C. and 85° C. or between 60° C. and 80° C.

The amount of plasticizing hydrocarbon resin useful in any particular embodiment of the present invention depends upon the particular circumstances and the desired result and may be present in an amount of between 5 phr and 100 phr or alternatively, between 30 phr and 60 phr, between 20 phr and 60 phr, between 30 phr and 90 phr, between 30 phr and 55 phr or between 35 phr and 50 phr. As noted above, since both a plasticizing liquid and a plasticizing hydrocarbon resin are included in the plasticizing system, the amount of both types of plasticizers are adjusted as described below to obtain the desired physical characteristics of the rubber articles to improve their abrasion resistance properties.

The amount of the plasticizing system is adjusted to provide the rubber composition with a glass transition temperature of between −35° C. and 0° C. and a dynamic modulus G* at 60° C. of between 0.7 MPa and 1.6 MPa or alternatively between 0.9 MPa and 1.4 MPa, between 0.8 MPa and 1.4 MPa, between 1.0 MPa and 1.4 MPa or between 1.0 MPa and 1.1 MPa, both measured in accordance with ASTM D5992-96. As such, the ratio of the amount of liquid plasticizer (phr) to the amount of plasticizing resin (phr) may be adjusted to achieve the desired physical properties of the rubber composition. Such ratios may range from between 0.1 and 0.7 or alternatively between 0.2 and 0.5 or 0.3 and 0.5.

The rubber compositions disclosed herein are suitable for use in the manufacture of treads and as known to one skilled in the art, the Tg of the cured rubber composition may be adjusted to provide a tread for a tire that is more suitable for a given season. As such the Tg of the rubber compositions may be adjusted around the broad range mentioned above using the plasticizers disclosed to provide a Tg of between −35° C. and −25° C. for winter tires, between −30° C. and −17° C. for all-season tires and between −17° C. and 0° C. for summer tires.

In addition to the rubber components and the plasticizing system described above, the rubber compositions suitable for the articles disclosed herein may further include a carbon black filler. The carbon black is a reinforcing filler and is used extensively in tires to provide desirable characteristics such as tear strength, modulus and wear. Useful compositions as disclosed herein do not include any significant amount of silica, i.e., no silica at all or an amount that does not have an effect on the cured rubber properties.

In particular embodiments of the rubber compositions disclosed herein, the compounding amount of the carbon black may be between 75 phr and 130 phr or alternatively between 85 phr and 120 phr or between 90 phr and 110 phr.

Suitable carbon blacks are any carbon blacks, in particular the blacks that are conventionally used in tires and particularly in treads and sidewalls. Non-limitative examples of carbon blacks include, for example, the N115, N134, N234, N330, N339, N343, N347 and N375 carbon blacks. Other useful carbon blacks include, for example, N440, N539, N550, N650, N660, N754 and N765.

In addition to the rubber components, the plasticizing system and the reinforcing filler described above, the rubber compositions suitable for the rubber articles disclosed herein may further be cured by a dual curing system that includes both a peroxide curing agent and a sulfur curing agent. It is the use of this dual curing system for the disclosed rubber compositions that provide the improved abrasion resistance properties of the cured rubber articles.

The peroxide curing agent provides the cross-linking mechanism for the formation of covalent bonds between the elastomer chains resulting from the decomposition of the peroxide to form radicals and the subsequent crosslink-forming reactions.

Examples of suitable peroxide curing agents include di-cumyl peroxide; tert-butyl cumyl peroxide; 2,5-dimethyl-2,5 bis(tertbutyl peroxy)hexyne-3; bis(tert-butyl peroxy isopropyl)benzene; 4,4-di-tert-butyl peroxy N-butyl valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane, as well as other peroxides known to those having ordinary skill in the art and combinations thereof. Such peroxides are available, for example, as VUL-CUP-R, which is α, α'-bis-(tert-butyl peroxy)-diisopropyl benzene and DI CUP, which is di-cumyl peroxide, both available from Arkema having offices in Philadelphia, Pa.

For particular embodiments of the rubber compositions disclosed herein, the peroxide curing agent may be added to the rubber composition in an effective amount such as between 0.4 phr and 1.6 phr of active peroxide or alternatively between 0.5 phr and 1.1 phr. Since the peroxide products often include inactive ingredients added to the active peroxide, the amount of peroxide disclosed is the amount of active peroxide that should be added to the useful rubber compositions based upon a peroxide such as α, α'-bis-(tert-butyl peroxy)-diisopropyl benzene.

The sulfur curing agent provides the cross-linking mechanism for the formation of sulfur bridges between the polymer chains providing the cured state of the rubber composition. Sulfur may be provided as free sulfur and/or as a sulfur donor.

Examples of suitable sulfur donors are well known and include tetramethylthiuram disulfide and 4,4'-dithiodimorpholine. Suitable free sulfur includes, for example, pulverized sulfur, rubber maker's sulfur, commercial sulfur, and insoluble sulfur. For particular embodiments of the rubber compositions disclosed herein, the amount of sulfur that is included in the dual curing system of the rubber compositions disclosed herein may be between 0.9 and 2.1 phr or alternatively between 1 phr and 1.9 phr.

Particular embodiments of the rubber compositions disclosed herein may further include as part of the dual curing system, for example, one or more of accelerators, stearic acid and zinc oxide. Zinc oxide may be added in an amount, for example, of between 1 phr and 6 phr or alternatively, of between 1.5 phr and 4 phr. Stearic acid may be add in an amount, for example, of between 0.5 phr and 3 phr or alternatively between 1 phr and 2.5 phr.

Accelerators are used to control the time and/or temperature required for vulcanization and to improve the properties of the cured rubber composition. Particular embodiments of the rubber compositions disclosed herein include one or more accelerators. One example of a suitable primary accelerator useful in particular embodiments of the rubber compositions disclosed herein is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamide (NOBS) and N'-dicyclohexyl-2-benzothiazolesulfenamide (DCBS). Such accelerators may be included in particular embodiments in an amount of between 0.8 phr and 2.1 phr of the accelerator or alternatively between 1 phr and 2 phr.

Other additives can be added to the rubber compositions disclosed herein as known in the art. Such additives may include, for example, some or all of the following: antidegradants, antioxidants, fatty acids and waxes. Examples of antidegradants and antioxidants include 6PPD, 77PD, IPPD and TMQ and may be added to rubber compositions in an amount, for example, of from 0.5 phr and 5 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C. is reached.

After cooling of the mixture, a second phase of mechanical working is implemented at a lower temperature. Sometimes referred to as "productive" phase, this finishing phase consists of incorporating by mixing the vulcanization (or cross-linking) system including the sulfur, any accelerators and the peroxide in a suitable device, for example an open mill. It is performed for an appropriate time (typically for example between 1 and 30 minutes) and at a sufficiently low temperature lower than the vulcanization temperature of the mixture, so as to protect against premature vulcanization.

The rubber composition can be formed into useful articles, including treads and sidewalls for use on vehicle tires and in particular embodiments for tire treads and/or sidewalls for use on passenger cars and/or light trucks. The treads may be formed as tread bands and then later made a part of a tire or they be formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread, including, e.g., the grooves, ribs and/or blocks molded into the tread.

As is known to those skilled in the art, tires treads may be constructed in a layered form, such as a cap and base construction, wherein the cap is formed of one rubber composition and the base is formed in another rubber composition. It is recognized that in such tread constructions, the disclosed rubber compositions are useful for that part of the tread that actually makes contact with the running surface, e.g., the road surface.

It should be noted that the foregoing included detailed references to particular embodiments of the present invention, which were provided by way of explanation of the invention. For example, features illustrated or described as part of one embodiment can be used with another embodiment to yield still a third embodiment. The invention is further illustrated by the following examples, which are to be regarded only as illustrations and not delimitative of the invention in any way. The properties of the compositions disclosed in the examples were evaluated as described below and these methods are suitable for measurement of the claimed properties of the present invention.

Modulus of elongation (MPa) was measured at 10% (MA10), 100% (MA100) and 300% (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The Shore A hardness of the compositions after curing is assessed in accordance with ASTM Standard D 2240-86.

The abrasion resistance was measured in accordance with ASTM D5963 on a rotary drum abrader. The test piece was moved across the surface of an abrasive sheet mounted on a revolving drum with the test piece also revolving as it was moved across the drum surface. The abrasion resistance was measured by the difference in mass before and after subjecting the vulcanized rubber test piece to testing on the rotary drum abrader. The abrasion resistance of a test piece is greater if the difference in the mass is less, i.e., less rubber has been removed from the sample piece.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The shear modulus G* at 60° C. was captured and the temperature at which the max tan delta occurred was recorded as the glass transition temperature, Tg.

EXAMPLE 1

Rubber compositions were prepared using the components shown in Tables 1. The amount of each component making up these rubber compositions are provided in parts per hundred parts of rubber by weight (phr).

TABLE 1

| Rubber Formulations | | |
|---|---|---|
| Formulations | W1 | F1 |
| SBR | 57 | 57 |
| BR | 43 | 43 |
| Carbon Black, N234 | 97 | 97 |
| Oil | 16 | 16 |
| Resin | 41 | 41 |
| Antidegradants | 3.5 | 3.5 |
| Processing Aid | 1.5 | 1.5 |
| Stearic Acid | 1.8 | 1.8 |
| Zinc Oxide | 2 | 2 |
| Sulfur | 1.5 | 1.5 |
| CBS | 1.5 | 1.5 |

TABLE 1-continued

| Rubber Formulations | | |
|---|---|---|
| Formulations | W1 | F1 |
| Peroxide* | | 2 |
| Physical Properties | | |
| Shear Modulus G*60 @ 60° C. & 0.7 MPa | 1.10 | 1.22 |
| Tg, ° C. | −22 | −22 |
| MA10 @ 23° C., MPa | 4.96 | 5.29 |
| MA100 @ 23° C., MPa | 1.50 | 1.70 |
| MA300 @ 23° C., MPa | 1.45 | 1.77 |
| Abrasion Resistance, normalized | 100 | 35 |
| Shore A Hardness | 63 | 64 |

*Peroxide component contained only 40% active peroxide

The resin was the C5-C9 resin Oppera 373N available from ExxonMobil and having a z average molecular weight greater than 20,000, a weight average molecular weight of about 2500, a softening point of about 89° C. and has a glass transition temperature of about 39° C. The plasticizing oil was AGRI-PURE 80 and the antidegradants included wax and 6PPD. The SBR was a functionalized SBR having trans-1,4 content of 38.1 wt. % functionalized at chain ends with a silanol group.

The peroxide curing agent was VULCUP R, which includes 60% non-active ingredients so that the amount of active peroxide was 0.8 phr of active peroxide.

The rubber formulations were prepared by mixing the components given in Table 1, except for the peroxide, sulfur and accelerator, in a Banbury mixer by the process described above. The vulcanization package was added in the second phase on a mill.

Vulcanization was effected (25 minutes at 170° C.) and the formulations were then tested to measure their physical properties as reported in Table 1.

As can be seen from the results shown in Table 1, the abrasion of the rubber composition having the dual curing system had a reduction in its abrasion by about 65%. The mass loss of the witness W1 during the abrasion testing was 67 mg compared to the mass loss of the inventive composition F1 during the abrasion testing of 23 mg.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber component for a tire, the rubber component comprising a rubber composition that is based upon a cross-linkable rubber composition, the cross-linkable rubber composition comprising, per 100 parts by weight of rubber (phr):
- 100 phr of two elastomers including at least 50 phr of a styrene-butadiene copolymer (SBR) and a polybutadiene (BR) as the remainder;
- between 75 phr and 130 phr of a carbon black;
- an effective amount of a plasticizing system that includes a plasticizing resin having a glass transition temperature (Tg) of at least 25 °C. and a plasticizing liquid, wherein the effective amount of the plasticizing system provides the rubber composition with a shear modulus G* measured at 60° C. of between 0.7 MPa and 1.6 MPa and a Tg of between −30 °C. and 0 °C.;
- a dual curing system comprising a peroxide curing agent and a sulfur curing agent.

2. The rubber component of claim 1, wherein the cross-linkable rubber composition comprises between 50 phr and 90 phr of the SBR copolymer.

3. The rubber component of claim 2, wherein the cross-linkable rubber composition comprises between 55 phr and 80 phr of the SBR copolymer.

4. The rubber component of claim 1, wherein the cross-linkable rubber composition comprises between 5 phr and 50 phr of the plasticizing liquid.

5. The rubber component of claim 1, wherein the cross-linkable rubber composition comprises between 10 phr and 30 phr of the plasticizing liquid.

6. The rubber component of claim 1, wherein the plasticizing liquid is a vegetable oil having an oleic acid content of at least 70 weight percent.

7. The rubber component of claim 1, wherein the effective amount of the plasticizing system provides the rubber composition with the shear modulus G* measured at 60 °C. of between 1.0 MPa and 1.4 MPa.

8. The rubber component of claim 1, wherein the effective amount of the plasticizing system provides the rubber composition with the shear modulus G* measured at 60 °C. of between 0.8 MPa and 1.4 MPa.

9. The rubber component of claim 1, wherein the effective amount of the plasticizing system provides the rubber composition with the Tg of between −35 °C. and −25 °C.

10. The rubber component of claim 1, wherein the effective amount of the plasticizing system provides the rubber composition with the Tg of between −30 °C. and −17 °C.

11. The rubber component of claim 1, wherein the effective amount of the plasticizing system provides the rubber composition with the Tg of between −17 °C. and 0 °C.

12. The rubber component of claim 1, wherein the cross-linkable rubber composition comprises between 85 phr and 120 phr of the carbon black.

13. The rubber component of claim 1, wherein the cross-linkable rubber composition comprises between 0.4 phr and 1.6 phr of the peroxide curing agent and between 0.9 phr and 2.1 phr of the sulfur curing agent.

14. The rubber component of claim 1, wherein the cross-linkable rubber composition further comprises a curing accelerator.

15. The rubber component of claim 14, wherein the curing accelerator is a sulfenamide accelerator.

16. The rubber component of claim 1, wherein the rubber component is a sidewall.

17. The rubber component of claim 1, wherein the rubber component is a tread.

18. The rubber component of claim 17, wherein the tread is for an off-the-road tire.

* * * * *